(12) United States Patent
Hwang et al.

(10) Patent No.: US 11,487,630 B2
(45) Date of Patent: Nov. 1, 2022

(54) STORAGE DEVICE AND DATA PROCESSING METHOD THEREOF

(71) Applicant: SAMSUNG ELECTRONICS CO., LTD., Suwon-si (KR)

(72) Inventors: Si-Nae Hwang, Seoul (KR);
Hyun-Chul Park, Suwon-si (KR);
Su-Ryun Lee, Suwon-si (KR);
Ju-Young Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 461 days.

(21) Appl. No.: 16/551,298

(22) Filed: Aug. 26, 2019

(65) Prior Publication Data

US 2020/0218619 A1 Jul. 9, 2020

(30) Foreign Application Priority Data

Jan. 8, 2019 (KR) .................. 10-2019-0002399

(51) Int. Cl.
*G06F 16/00* (2019.01)
*G06F 11/14* (2006.01)
(Continued)

(52) U.S. Cl.
CPC ...... *G06F 11/1471* (2013.01); *G06F 11/1451* (2013.01); *G06F 12/0804* (2013.01);
(Continued)

(58) Field of Classification Search
CPC .. G06F 16/78; G06F 16/2264; G06F 16/2272; G06F 16/172; G06F 16/1815;
(Continued)

(56) References Cited

U.S. PATENT DOCUMENTS 7,774,555 B2    8/2010  Lewin et al.
7,873,601 B1 *  1/2011  Kushwah ............ G06F 11/1451
                                               707/654

(Continued)

FOREIGN PATENT DOCUMENTS

WO    WO2008021527 A2 *  2/2008
WO    WO2008127698 A2 * 10/2008
(Continued)

OTHER PUBLICATIONS

Margo I. Seltzer et al., "Journaling versus Soft Updates Asynchronous Meta-data Protection in File Systems", Proceedings of 2000 USENIX Annual Technical Conference, Jun. 18-23, 2000, pp. 1-15.*

*Primary Examiner* — Srirama Channavajjala
(74) *Attorney, Agent, or Firm* — F. Chau & Associate, LLC

(57) ABSTRACT

A storage device includes a memory device including a metadata area and a journal data area. A memory controller is configured to control the memory device to write a metadata block to the metadata area and to write a journal data block to the journal data area. The metadata block includes metadata, and the journal data block includes both journal data and metadata storage information. The journal data includes log information pertaining to the metadata, and the metadata storage information includes information pertaining to storage of the metadata block.

13 Claims, 18 Drawing Sheets

(51) Int. Cl.
   *G06F 16/18*       (2019.01)
   *G06F 12/0897*     (2016.01)
   *G06F 12/0804*     (2016.01)
   *G06F 12/0868*     (2016.01)
   *G06F 16/908*      (2019.01)
   *G06F 16/22*       (2019.01)
   *G06F 16/383*      (2019.01)

(52) U.S. Cl.
   CPC ...... *G06F 12/0868* (2013.01); *G06F 12/0897* (2013.01); *G06F 16/1815* (2019.01); *G06F 16/22* (2019.01); *G06F 16/383* (2019.01); *G06F 16/908* (2019.01); *G06F 2201/80* (2013.01); *G06F 2212/1032* (2013.01); *G06F 2212/304* (2013.01)

(58) Field of Classification Search
   CPC ............... G06F 11/147; G06F 11/1435; G06F 11/2094; G06F 11/0871; G06F 11/1471; G06F 12/0244; G06F 12/0253; G06F 12/0804; G06F 12/0897; G06F 3/064; G06F 3/0644; G06F 3/0631; G06F 3/0683; G06F 3/0608; G06F 3/0664; G06F 16/22; G06F 16/1847; G06F 16/383; G06F 16/908; G06F 12/0868
   See application file for complete search history.

(56) References Cited

U.S. PATENT DOCUMENTS

| | | | |
|---|---|---|---|
| 8,909,851 B2 * | 12/2014 | Jones | G06F 12/0246 711/103 |
| 9,164,855 B1 | 10/2015 | Cousins | |
| 9,176,887 B2 | 11/2015 | Habermann | |
| 9,442,941 B1 | 9/2016 | Luz et al. | |
| 9,946,660 B2 * | 4/2018 | Iyer | G06F 12/023 |
| 10,657,043 B2 * | 5/2020 | Park | G06F 1/30 |
| 10,705,965 B2 * | 7/2020 | Shveidel | G06F 12/0868 |
| 2006/0155952 A1 * | 7/2006 | Haas | G06F 16/10 711/216 |
| 2009/0150599 A1 * | 6/2009 | Bennett | G06F 11/1471 711/103 |
| 2010/0185802 A1 * | 7/2010 | Asnaashari | G06F 3/0608 711/170 |
| 2012/0137299 A1 | 5/2012 | Moyer | |
| 2015/0058291 A1 * | 2/2015 | Earl | G06F 11/1471 707/625 |
| 2015/0379036 A1 | 12/2015 | Shin et al. | |
| 2016/0154594 A1 * | 6/2016 | Kang | G06F 3/0688 711/103 |
| 2016/0232112 A1 | 8/2016 | Lee | |
| 2016/0378818 A1 * | 12/2016 | Marcotte | G06F 16/183 707/703 |
| 2017/0046081 A1 * | 2/2017 | Palmer | G01N 29/2481 |
| 2017/0344478 A1 * | 11/2017 | Feng | G06F 11/1474 |
| 2018/0032445 A1 * | 2/2018 | Lee | G06F 12/0868 |
| 2018/0284995 A1 * | 10/2018 | Dantkale | G06F 3/065 |
| 2019/0107964 A1 * | 4/2019 | Liang | G06F 3/0679 |

FOREIGN PATENT DOCUMENTS

| | | |
|---|---|---|
| WO | WO2010033962 A1 * | 3/2010 |
| WO | WO2012125314 A2 * | 9/2012 |
| WO | WO2016111954 A1 * | 7/2016 |

* cited by examiner

STORAGE DEVICE AND DATA PROCESSING METHOD THEREOF

CROSS-REFERENCE TO RELATED APPLICATION

This application claims priority to and the benefit of Korean Patent Application No. 10-2019-0002399, filed on Jan. 8, 2019, in the Korean Intellectual Property Office, the disclosure of which is herein incorporated by reference in its entirety.

TECHNICAL FIELD

The present disclosure relates to a storage device and, more particularly, to a storage device and a data processing method of the storage device.

DISCUSSION OF THE RELATED ART

Electronic devices such as smart phones, tablet computers, and personal computers may incorporate storage devices to store various kinds of data. Electronic devices may additionally include main memory (e.g., random access memory (RAM).

When sudden/unexpected power problems or system crashes occur during the operation of such electronic devices, some of the data managed by a file system of the electronic device may be damaged. To protect against this damage, electronic devices may implement a journaling file system. The journaling file system keeps track of changes made to the data by logging the changes to memory before the changes are applied to the main part of the file system.

SUMMARY

A storage device includes a memory device including a metadata area and a journal data area. A memory controller is configured to control the memory device to write a metadata block to the metadata area and to write a journal data block to the journal data area. The metadata block includes metadata, and the journal data block includes both journal data and metadata storage information. The journal data includes log information pertaining to the metadata, and the metadata storage information includes information pertaining to storage of the metadata block.

A method for processing data of a storage device includes accumulating metadata in a metadata block, using a memory controller. Journal data is accumulated in a journal data block using the memory controller. The journal data includes log information pertaining to the metadata. Metadata storage information pertaining to storage of the metadata block is added to the journal data block when the metadata block is written to a metadata area of a memory device of the storage device, using the memory controller. The journal data block is written to a journal data area of the memory device when an amount of data accumulated in the journal data block reaches a first predetermined size.

A method for processing data of a storage device includes accumulating, by a memory controller, first journal data in a journal data block. A first metadata block is written to a metadata area of a memory device of the storage device. Metadata storage information about storage of the first metadata block is accumulated by the memory controller in the journal data block. Second journal data is accumulated in the journal data block by the memory controller. The journal data block is written to a journal data area of the memory device.

BRIEF DESCRIPTION OF THE DRAWINGS

A more complete appreciation of the present inventive concept and many of the attendant aspects thereof will be more clearly understood from the following detailed description taken in conjunction with the accompanying drawings in which.

DETAILED DESCRIPTION OF THE EMBODIMENTS

Figure 1:
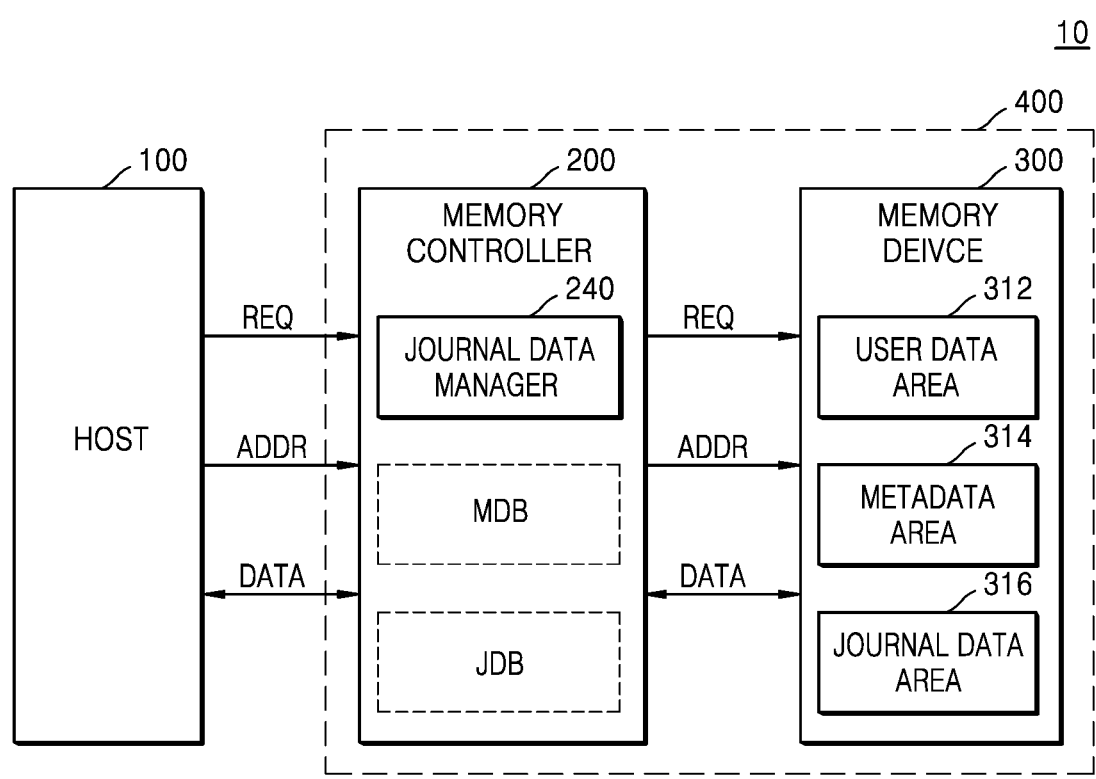
FIG. 1 is a block diagram illustrating a data processing system according to an exemplary embodiment of the present inventive concept.

FIG. 1 is a diagram illustrating a data processing system 10 according to an exemplary embodiment of the present inventive concept. The data processing system 10 may include a host 100 device and a memory system 400. The host device may be a computer device that makes use of the memory system 400. The memory system 400 may include a memory controller 200 and a memory device 300. The data processing system 10 may be applied to one of various electronic devices such as an ultra mobile personal computer (UMPC), a workstation, a netbook, a personal digital assistant (PDA), a portable computer such as a laptop or notebook computer, a web tablet, a wireless phone, a mobile phone, a smart phone, an e-book reader, a portable multimedia player (PMP), a portable game machine, a navigation device, a black box, a digital camera, etc.

The data processing system 10 may be implemented in various forms. For example, the host 100, the memory controller 200, and the memory device 300 may each be provided as a single chip, a single package, or a single module. However, the present invention is not limited thereto, and the memory controller 200 may be provided as the memory system 400 or a storage device together with the memory device 300.

The memory system 400 may be embodied as a PC card, a compact flash card, a smart media card, a memory stick, a multimedia card (MMC), a secure digital (SD) card, or a universal flash storage (UFS). In an exemplary embodiment of the present inventive concept, the memory system 400 may form a solid state disk/drive (SSD). For convenience of description, it is assumed that the memory system 400 is implemented as a single storage device, but the present inventive concept is not limited thereto.

The host 100 may transmit a data operation request REQ and an address ADDR to the memory controller 200 and may exchange data with the memory controller 200. For example, the host 100 may exchange data with the memory controller 200 based on various interface protocols such as a universal serial bus (USB) protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a mobile industry processor interface (MIPI) protocol, and/or a UFS protocol.

The memory controller 200 may control the memory device 300. For example, the memory controller 200 may control the memory device 300 so as to read data stored in the memory device 300 or to write data to the memory device 300 in response to the data operation request REQ from the host 100. For example, the memory controller 200 may provide the address ADDR, a command CMD, and a control signal to the memory device 300 to control write, read, and erase operations of the memory device 300. In addition, data for these operations may be transmitted between the memory controller 200 and the memory device 300.

According to an exemplary embodiment of the present inventive concept, the memory controller 200 may include a journal data manager 240 and may store a metadata block MDB and a journal data block JDB. The journal data manager 240 may manage the metadata block MDB and the journal data block JDB. The metadata block MDB may include metadata, and the journal data block JDB may include journal data and metadata storage information.

Here, metadata may refer to data for the management of user data or data that is generated in the memory system 400 to manage the memory device 300. For example, metadata may include mapping information used to translate a logical address into a physical address in the memory device 300, physical block information about memory pages included in physical blocks of the memory device 300, trim data indicating data deleted from the host 100, and/or various kinds of information for management of memory space of the memory device 300. In an exemplary embodiment of the present inventive concept, metadata may further be data pertaining to data that is itself considered metadata.

Journal data may refer to data including log information corresponding to a change in user data and/or a change in metadata. Journal data may include a plurality of items of log entry information. For example, journal data may include information about a check point of user data and/or metadata. In an exemplary embodiment of the present inventive concept, log entry information may include information about a type indicating an operation causing a change in metadata and actual data for restoring the change in the metadata. Information about a type indicating an operation causing a change in metadata may include information defining a type of any operation, such as a write operation, a block allocation operation, and a page copy operation, that may cause a change in the metadata. Actual data for restoring a change in metadata may include a logical address, a previous physical address, and a new physical address. Log entry information may be referred to as a log entry.

Metadata storage information may be data that is generated by the memory controller 200 when a metadata block is written to the memory device 300. In an exemplary embodiment of the present inventive concept, metadata storage information may include an age of a metadata block (e.g. a length of time that has elapsed since the creation of the metadata block), which is assigned by the memory controller 200, and a physical page number (PPN) in the memory device 300, in which the metadata block is stored.

In an exemplary embodiment of the present inventive concept, the journal data manager 240 may accumulate data in the metadata block MDB and the journal data block JDB. For example, the journal data manager 240 may accumulate metadata in the metadata block MDB and accumulate journal data in the journal data block JDB. When the metadata block MDB is written to the memory device 300, the journal data manager 240 may add metadata storage information to the journal data block JDB. In an exemplary embodiment of the present inventive concept, the journal data manager 240 may write the metadata block MDB to a metadata area 314 of the memory device 300 when the amount of data stored in the metadata block MDB reaches a first size. It may be understood herein that when the journal data manager 240 or the memory controller 200 writes data to the memory device 300, the memory device 300 is controlled by the journal data manager 240 or the memory controller 200 to write the data. In an exemplary embodiment of the present inventive concept, the journal data manager 240 may write the journal data block JDB to a journal data area 316 of the memory device 300 when the amount of data stored in the journal data block JDB reaches a second size. In an exemplary embodiment of the present inventive concept, the first size and the second size may each be equal to the size of a memory page in the memory device 300.

In an exemplary embodiment of the present inventive concept, when the memory system 400 is powered on after being powered off, the journal data manager 240 may read metadata blocks and journal data blocks from the memory device 300. The journal data manager 240 may determine the order of accumulation of journal data in the journal data blocks and the order of accumulation of metadata in the metadata blocks based on metadata storage information included in each of the journal data blocks. The journal data manager 240 may restore or update the metadata using the journal data based on the order of accumulation. Here, a power-off event may refer to a sudden and/or unexpected power-off event occurring when power supply to the memory system 400 is interrupted without a power-off command input to the memory system 400.

In an exemplary embodiment of the present inventive concept, when the memory controller 200 receives a data guarantee request from the host 100, the journal data manager 240 may generate an L1 journal block using data stored in the entire area of the L1 cache of the memory controller 200 and may write the L1 journal block to the journal data area 316. The operations of the journal data manager 240 will be understood more clearly with reference to the attached drawings.

The memory device 300 may include at least one memory cell array. The memory cell array may include a plurality of memory cells that are each disposed at intersections between a plurality of word lines and a plurality of bit lines. The memory cells may include non-volatile memory cells. Each of the memory cells may be a multi-level cell (MLC) that stores at least two bits of data. For example, each memory cell may be a 2-bit MLC that stores two bits of data, a triple-level cell (TLC) that stores three bits of data, a quadruple-level cell (QLC) that stores four bits of data, or an MLC that stores at least five bits of data, but the present invention is not limited thereto. For example, some memory cells may be single-level cells (SLCs) that store one bit of data, and other memory cells may be MLCs.

The memory device 300 may include NAND flash memory, vertical NAND (VNAND) flash memory, NOR flash memory, resistive random access memory (RRAM), phase-change RAM (PRAM), magnetoresistive RAM (MRAM), ferroelectric RAM (FRAM), spin transfer torque RAM (STT-RAM), or a combination thereof. The memory device 300 may perform operations, such as a write operation, a read operation, and an erase operation, with respect to data in response to signals from the memory controller 200.

According to an exemplary embodiment of the present disclosure, the memory device 300 may include a user data area 312, the metadata area 314, and the journal data area 316. For example, a memory cell array of the memory device 300 may include the user data area 312, the metadata area 314, and the journal data area 316. The user data area 312 may store user data (e.g. normal data). The metadata area 314 may store at least one metadata block. The journal data area 316 may store at least one journal data block. Each of the user data area 312, the metadata area 314, and the journal data area 316 may be a separate area and may include at least one memory page.

According to an exemplary embodiment of the present disclosure, the data processing system 10 respectively stores metadata as the metadata block MDB and journal data as the journal data block JDB in separate areas of the memory device 300, thereby reducing dependency of the metadata on the journal data. Accordingly, the amount of metadata written to the memory device 300 may also be reduced. As a result, power consumption of the memory system 400 may be decreased, and the performance of the memory system 400 may be increased.

In addition, since metadata storage information is added to the journal data block JDB when the metadata block MDB is written to the memory device 300, consistency between metadata and journal data may be secured even when an unexpected event like a sudden/unexpected power-off occurs. Moreover, since all data stored in the L1 cache of the memory controller 200 is stored as a single block in the journal data area 316 based on a data guarantee request of the host 100, the consistency between metadata and journal data may be secured even when an unexpected event like sudden/unexpected power-off occurs. Furthermore, even when the memory system 400 does not include buffer memory, e.g., dynamic RAM (DRAM), that stores metadata or includes a small capacity of buffer memory, the memory system 400 may secure the consistency between metadata and journal data. When the consistency between metadata and journal data is secured as described above, the reliability of the memory system 400 may be enhanced.

Figure 2:
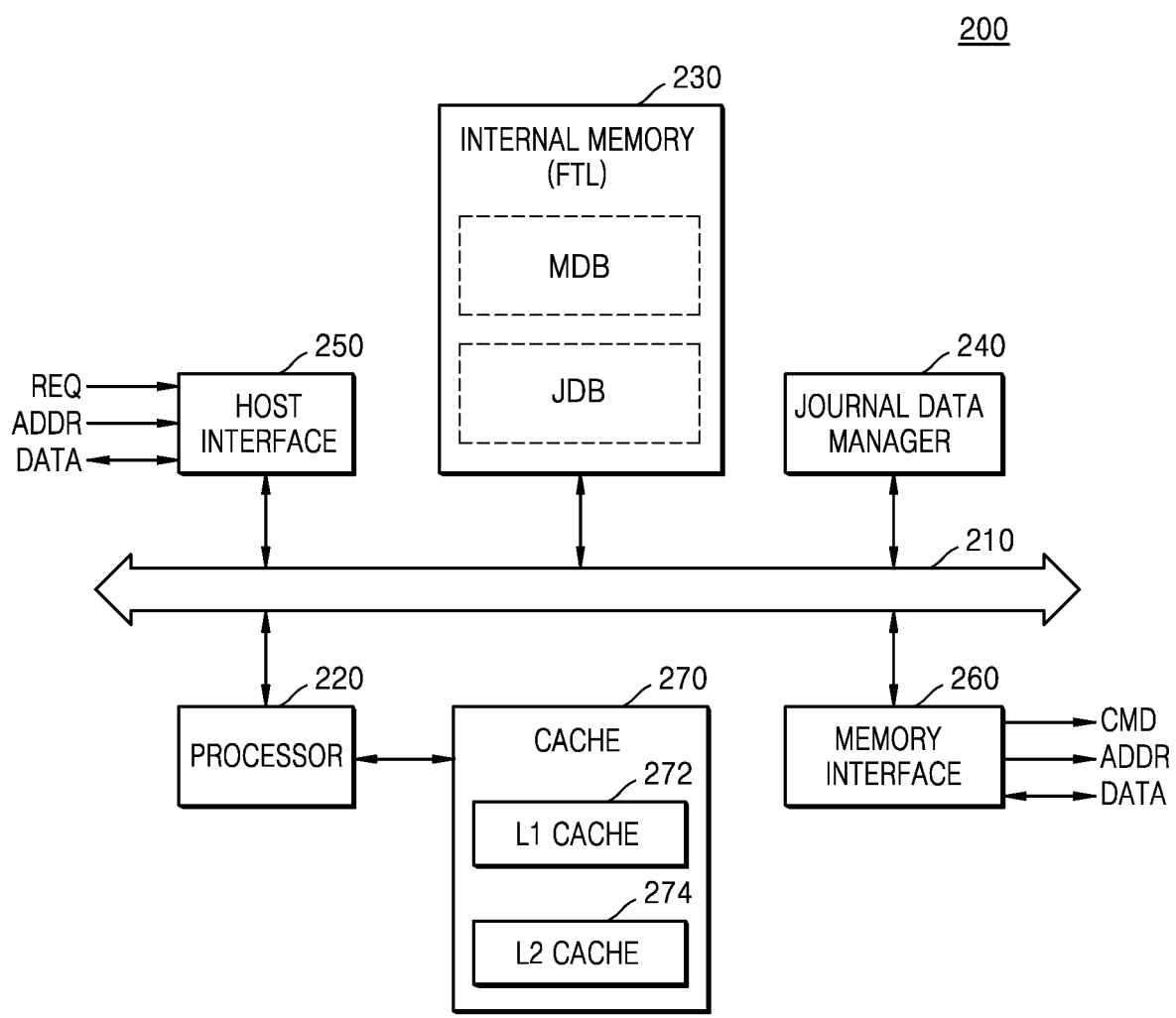
FIG. 2 is a block diagram illustrating a memory controller according to an exemplary embodiment of the present inventive concept.

FIG. 2 is a diagram illustrating the memory controller 200 according to an exemplary embodiment of the present inventive concept. The memory controller 200 may include a system bus 210, a processor 220 (e.g. a microprocessor circuit), an internal memory 230, a host interface 250, a memory interface 260, and a cache 270. The memory controller 200 may further include various other elements. For example, the memory controller 200 may further include a command generation module, which generates the command CMD for controlling a memory operation. Redundant descriptions of the memory controller 200 already given with respect to FIG. 1 will be omitted. FIG. 2 will be described together with reference to FIG. 1.

The system bus 210 may provide a channel between internal elements of the memory controller 200. The system bus 210 may operate based on one of various bus protocols.

The processor 220 may control all operations of the memory controller 200. The processor 220 may include processing units such as a central processing unit (CPU) and a micro controller unit (MCU). The processor 220 may run software and/or firmware for controlling the memory controller 200. For example, the software and/or the firmware may be loaded to the internal memory 230 and then run by the processor 220.

The internal memory 230 may be used as working memory, buffer memory, or cache memory of the processor 220. The internal memory 230 may include various kinds of memory. For example, the internal memory 230 may include DRAM, static RAM (SRAM), PRAM, and/or flash memory. In an exemplary embodiment of the present inventive concept, a flash translation layer (FTL) may be loaded to the internal memory 230. In an exemplary embodiment of the present inventive concept, the FTL may include firmware and all or part of the journal data manager 240.

According to an exemplary embodiment of the present disclosure, the internal memory 230 may store the metadata block MDB and the journal data block JDB. For example, the internal memory 230 may store the metadata block MDB until the metadata block MDB is written to the memory device 300 and may store the journal data block JDB until the journal data block JDB is written to the memory device 300.

The journal data manager 240 may manage metadata and/or journal data. For example, the journal data manager 240 may accumulate metadata in the metadata block MDB and journal data in the journal data block JDB. In an exemplary embodiment of the present inventive concept, when the metadata block MDB is written to the memory device 300, the journal data manager 240 may add metadata storage information, which includes information about storage of the metadata block MDB, to the journal data block JDB. In an exemplary embodiment of the present inventive concept, when the memory system 400 is powered on after being unexpectedly powered off, the journal data manager 240 may determine the order of accumulation of metadata and journal data based on metadata storage information included in each of journal data blocks read from the memory device 300 and may restore or update at least part of the metadata using the journal data based on the order of accumulation.

The journal data manager 240 may be implemented in various forms in the memory controller 200. According to an exemplary embodiment of the present inventive concept, the journal data manager 240 may be implemented by hardware and/or software. In the case that the journal data manager 240 is implemented by hardware, the journal data manager 240 may include circuits that manage metadata and/or journal data. In the case that the journal data manager 240 is implemented by software, data management may be performed when the processor 220 executes a program (or instructions) stored in the memory controller 200. However, the present invention is not limited thereto. The journal data manager 240 may be implemented by a combination of software and hardware, e.g., firmware. In an exemplary embodiment of the present inventive concept, all or part of the journal data manager 240 may be included in the FTL.

The host interface 250 may provide an interface between the host 100 and the memory controller 200. The memory controller 200 may receive the data operation request REQ, the address ADDR, and so on from the host 100 via the host interface 250 and may exchange data with the host 100 via the host interface 250.

The memory interface 260 may provide an interface between the memory device 300 and the memory controller 200. For example, data that has been processed by the processor 220 may be stored in the memory device 300 via the memory interface 260. Data stored in the memory device 300 may be provided to the processor 220 via the memory interface 260. The memory controller 200 may transmit the command CMD, the address ADDR, and so on to the memory device 300 via the memory interface 260 and may exchange data with the memory device 300 via the memory interface 260.

The cache 270 may store data for the operation of the processor 220 and may transmit the data to the processor 220 at the request of the processor 220. In an exemplary embodiment of the present inventive concept, the cache 270 may be implemented as SRAM. The cache 270 may include an L1 cache 272 and an L2 cache 274. In an exemplary embodiment of the present inventive concept, the L1 cache 272 may store log entries in an unsorted form. When necessary, the log entries in the L1 cache 272 may be flushed to the L2 cache 274 and have a form suitable for storage in the memory device 300.

According to an exemplary embodiment of the present disclosure, to provide against an event like sudden/unexpected power-off, the memory controller 200 may form or generate an L1 journal block using all data stored in the L1 cache 272 and store the L1 journal block in the journal data area 316 of the memory device 300 when the memory controller 200 receives a data guarantee request from the host 100. For example, the memory controller 200 may store the L1 journal block as a journal data block in the journal data area 316 of the memory device 300.

According to an exemplary embodiment, the memory controller 200 respectively stores metadata as the metadata block MDB and journal data as the journal data block JDB in separate areas of the memory device 300, thereby reducing dependency of the metadata on the journal data. Accordingly, the amount of metadata written to the memory device 300 may also be reduced. As a result, power consumption of the memory system 400 may be decreased, and the performance of the memory system 400 may be increased.

In addition, since metadata storage information is added to the journal data block JDB when the metadata block MDB is written to the memory device 300, consistency between metadata and journal data may be secured even when an unexpected event like sudden/unexpected power-off occurs. Moreover, since all data stored in the L1 cache 272 of the memory controller 200 is stored as a single block in the journal data area 316 based on a data guarantee request of the host 100, the consistency between metadata and journal data may be secured even when an unexpected event like sudden/unexpected power-off occurs. Furthermore, even when the memory system 400 does not include buffer memory, e.g., DRAM, that stores metadata or includes a small capacity of buffer memory, the memory system 400 may secure the consistency between metadata and journal data. When the consistency between metadata and journal data is secured as described above, the reliability of the memory system 400 may be enhanced.

Figure 3:
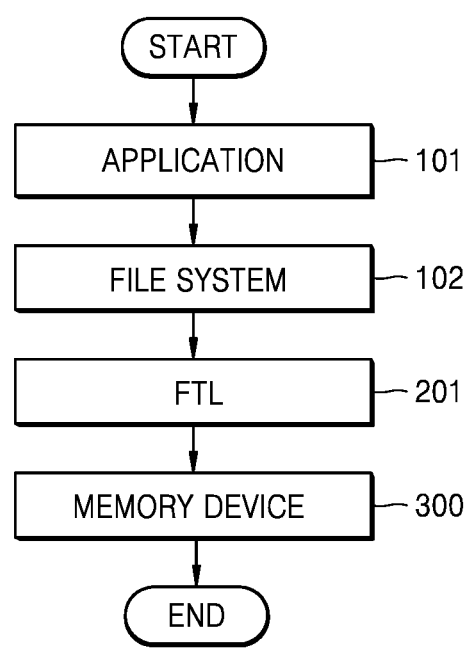
FIG. 3 is a flowchart illustrating software layers of a data processing system, according to an exemplary embodiment of the present inventive concept.

FIG. 3 is a diagram illustrating software layers of a data processing system, according to an exemplary embodiment of the present inventive concept. The software layers may include an application 101, a file system 102, and an FTL 201. FIG. 3 will be described with reference to FIGS. 1 and 2 together.

The application 101 may include various application programs running on the host 100. The file system 102 may organize files or data, which are used by the application 101. For example, the file system 102 may manage the storage space of the memory system 400 using logical addresses. The file system 102 may assign a logical address to data, which will be or has been stored in the memory system 400 and manage the logical address. The file system 102 may have a different form according to an operating system (OS) of the host 100. For example, the file system 102 may include file allocation table (FAT), FAT32, new technology file system (NTFS), hierarchical file system (HFS), journaled file system2 (JSF2), XFS, on-disk structure-5 (ODS-5), UDF, ZFS, unix file system (UFS), ext2, ext3, ext4, ReiserFS, Reiser5, ISO 9660, Gnome VFS, BFS, and/or WinFS. In an exemplary embodiment of the present inventive concept, the application 101 and the file system 102 may be software layers running on the host 100.

The FTL 201 may perform various maintenance operations between the host 100 and the memory device 300 such that the memory device 300 may be efficiently used. For example, the FTL 201 may perform translation between a logical address and a physical address. The FTL 201 may manage address translation using a mapping table.

Figure 4:
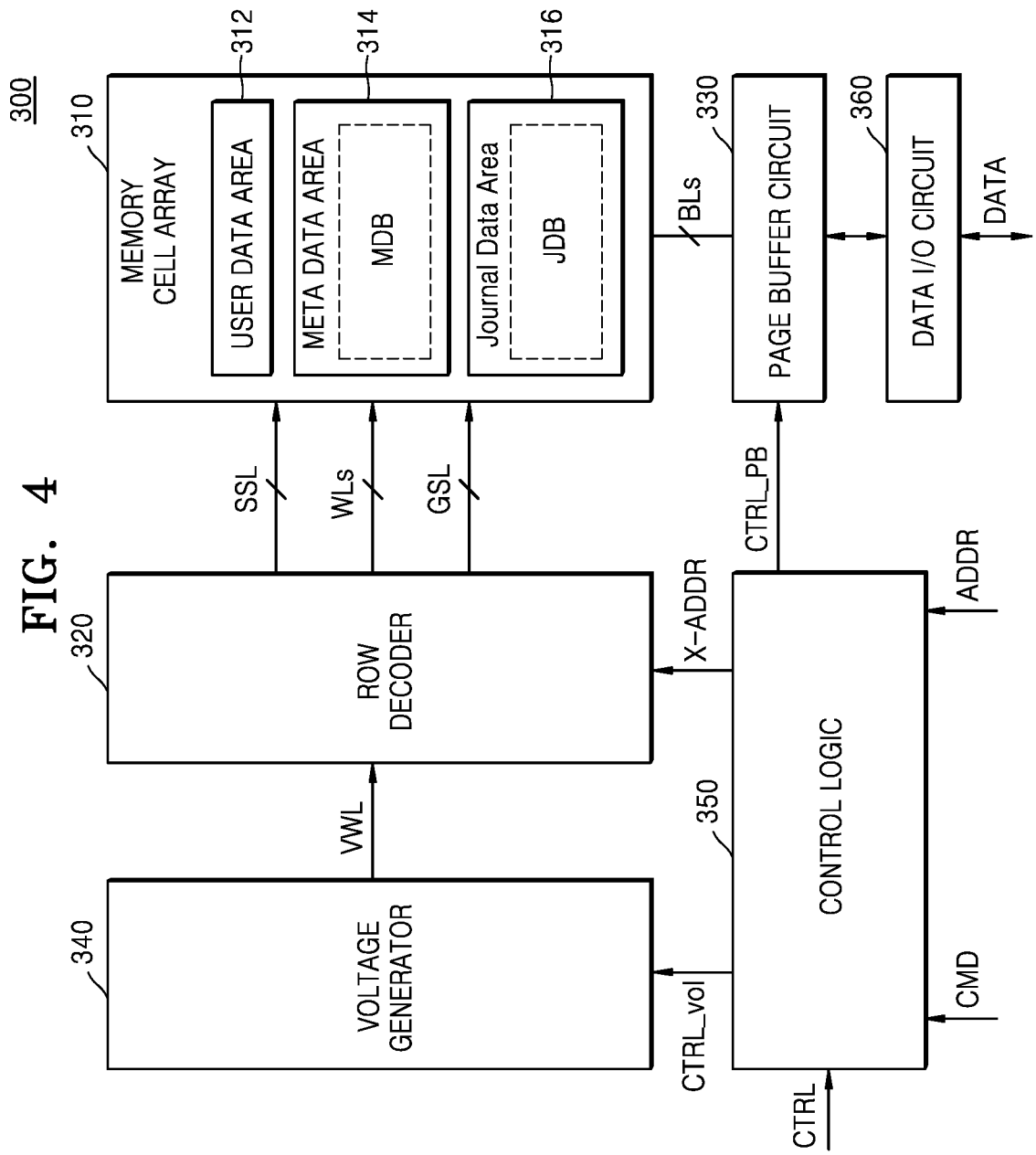
FIG. 4 is a block diagram illustrating a memory device according to an exemplary embodiment of the present inventive concept.

FIG. 4 is a diagram illustrating the memory device 300 according to an exemplary embodiment of the present inventive concept. The memory device 300 may include a memory cell array 310, a row decoder 320, a page buffer circuit 330, a voltage generator 340, a control logic 350, and a data input/output (I/O) circuit 360. Redundant descriptions of the memory device 300 given with reference to FIG. 1 will be omitted.

The memory cell array 310 may include a plurality of memory blocks. Each of the memory blocks may include a plurality of memory cells. The memory cell array 310 may be connected to the row decoder 320 through word lines WLs, string selection lines SSL, and ground selection lines GSL and may be connected to the page buffer circuit 330 through bit lines BLs. The memory cell array 310 may include strings respectively connected to the bit lines BLs.

Each of the strings may include at least one string selection transistor, a plurality of memory cells, and at least one ground selection transistor, which are connected in series between a bit line and a common source line.

According to an exemplary embodiment, the memory cell array 310 may include the user data area 312, the metadata area 314, and the journal data area 316. The user data area 312 may store user data (or normal data). The metadata area 314 may store at least one metadata block MDB. The journal data area 316 may store at least one journal data block JDB. In an exemplary embodiment of the present inventive concept, the user data area 312, the metadata area 314, and the journal data area 316 may be different from one another and each include at least one memory page. According to an exemplary embodiment of the present inventive concept, the user data area 312, the metadata area 314, and the journal data area 316 may be respectively included in different memory blocks, but the present invention is not limited thereto. For example, at least two of the user data area 312, the metadata area 314, and the journal data area 316 may be included in one memory block. Alternatively, at least two of part of the user data area 312, part of the metadata area 314, and part of the journal data area 316 may be included in one memory block.

The row decoder 320 may select some of the word lines WLs based on a row address X-ADDR. The row decoder 320 may apply a word line enable voltage to a word line. For example, during a data write operation, the row decoder 320 may apply a program voltage and a verify voltage to a selected word line and a program inhibit voltage to an unselected word line. During a data read operation, the row decoder 320 may apply a read voltage to a selected word line and a read inhibit voltage to an unselected word line. During a data erase operation, the row decoder 320 may apply a word line erase voltage to a word line. The row decoder 320 may select some of the string selection lines SSL or some of the ground selection lines GSL based on the row address X-ADDR.

The page buffer circuit 330 may be connected to the memory cell array 310 through the bit lines BLs and may perform a data write or read operation in response to a page buffer control signal CTRL_PB received from the control logic 350. The page buffer circuit 330 may be connected to a data line by selecting a bit line using a decoded column address.

The voltage generator 340 may generate various kinds of voltages, which are suited for performing write, read, and erase operations on the memory cell array 310, based on a voltage control signal CTRL_vol received from the control logic 350. For example, the voltage generator 340 may generate a word line driving voltage VWL for driving the word lines WLs. At this time, the word line driving voltage VWL may include a write voltage, a read voltage, a word line erase voltage, and a write verify voltage. The voltage generator 340 may further generate a string selection line driving voltage for driving the string selection lines SSL and a ground selection line driving voltage for driving the ground selection lines GSL.

The control logic 350 may generate various kinds of internal control signals, which are for writing data to or reading data from the memory cell array 310, based on the command CMD, the address ADDR, and a control signal CTRL, which are received from the memory controller 200. For example, the control logic 350 may control all operations in the memory device 300. The internal control signals generated by the control logic 350 may be provided to the page buffer circuit 330, the row decoder 320, and the voltage generator 340. For example, the control logic 350 may provide the page buffer control signal CTRL_PB to the page buffer circuit 330, the row address X-ADDR to the row decoder 320, and the voltage control signal CTRL_vol to the voltage generator 340. However, the kinds of control signals are not limited thereto, and the control logic 350 may provide other internal control signals. For example, the control logic 350 may provide a column address to a column decoder. The data I/O circuit 360 may be connected to the page buffer circuit 330 through data lines.

Figure 5A:
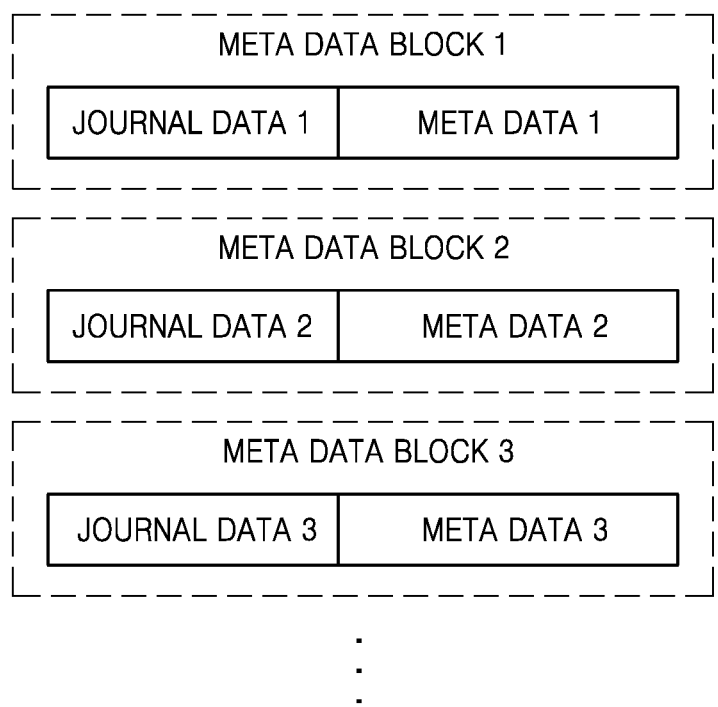
FIGS. 5A and 5B are diagrams illustrating metadata blocks according to a comparative example.
Figure 5B:
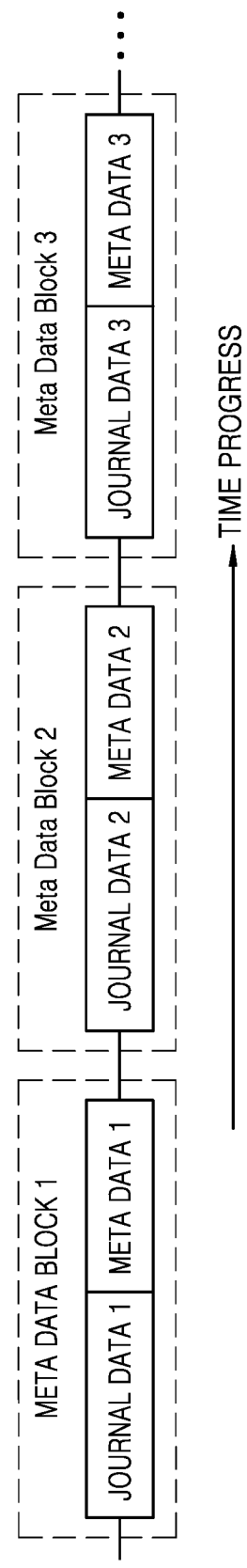

FIGS. 5A and 5B illustrate metadata blocks according to a comparative example. Each of the metadata blocks includes journal data and metadata. A memory controller, according to the comparative example, accumulates journal data and metadata and writes journal data and metadata to a memory device as a metadata block. For example, a first metadata block includes first journal data and first metadata, a second metadata block includes second journal data and second metadata, and a third metadata block includes third journal data and third metadata.

Referring to FIG. 5A, a memory controller may accumulate journal data when a checkpoint occurs for user data and/or metadata. When a predetermined amount of the journal data has accumulated, the memory controller writes the journal data and metadata corresponding to the predetermined amount to a memory device as a metadata block. For example, according to the comparative example, when journal data has been accumulated to a predetermined amount, a memory controller needs to newly write as much metadata as the predetermined amount to a memory device. A memory controller, according to the comparative example, needs to write journal data corresponding to a predetermined amount and metadata corresponding to the predetermined amount to a memory device as a metadata block because determination of the order of an accumulation time of the journal data and a write time of the metadata is important. Only when a memory controller determines the order of a journal data accumulation time and a metadata write time, the memory controller may restore or update metadata using journal data in the case of power-on following an event like sudden/unexpected power-off.

In particular, FIG. 5B is a diagram illustrating the order of writing metadata blocks over time. When the first journal data has been accumulated to a predetermined amount, a memory controller writes the first journal data and the first metadata to a memory device as the first metadata block. Thereafter, when the second journal data has been accumulated to the predetermined amount, the memory controller writes the second journal data and the second metadata to the memory device as the second metadata block. Thereafter, when the third journal data has been accumulated to the predetermined amount, the memory controller writes the third journal data and the third metadata to the memory device as the third metadata block. For example, since the first through third metadata blocks are written to the memory device in order of time (e.g. in order of occurrence), the memory controller may determine the order of accumulation times of the first through third journal data and write times of the first through third metadata after power-on.

Referring to FIGS. 5A and 5B, since a memory controller, according to the comparative example, needs to write a predetermined amount of metadata when journal data has been accumulated to the predetermined amount, there is a significant amount of unnecessary metadata write operations.

Figure 6:
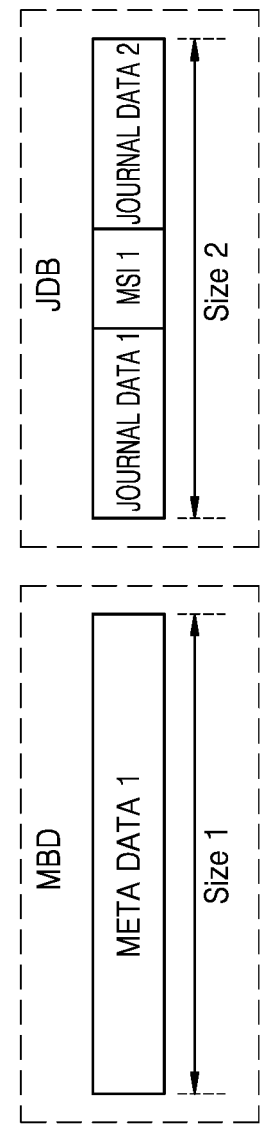
FIG. 6 is a diagram illustrating a metadata block and a journal data block, according to an exemplary embodiment of the present inventive concept.

FIG. 6 is a diagram illustrating the metadata block MDB and the journal data block JDB, according to an exemplary embodiment of the present inventive concept. FIG. 6 will be described with reference to FIGS. 1 and 2 together.

The metadata block MDB may include metadata, and the journal data block JDB may include journal data and metadata storage information. For example, the metadata block MDB may include first metadata, and the journal data block JDB may include first journal data, first metadata storage information MSI1, and second journal data.

The journal data manager 240 of the memory controller 200 may accumulate metadata in the internal memory 230. Forming the metadata block MDB by accumulating metadata in the internal memory 230 using the journal data manager 240 may refer to accumulating metadata in the metadata block MDB using the journal data manager 240. For example, the journal data manager 240 may accumulate metadata in the metadata block MDB. When the amount of metadata accumulated in the metadata block MDB reaches a first predetermined size, the journal data manager 240 may write the metadata block MDB to the metadata area 314 of the memory device 300. For example, when the amount of metadata accumulated in the metadata block MDB reaches the first predetermined size, the journal data manager 240 may control the memory device 300 to write the metadata block MDB to the metadata area 314. For example, the journal data manager 240 may control the memory controller 200 to transmit an address corresponding to the metadata area 314, a write command, and the metadata block MDB to the memory device 300.

The journal data manager 240 of the memory controller 200 may accumulate journal data in the internal memory 230. Forming the journal data block JDB by accumulating journal data in the internal memory 230 using the journal data manager 240 may refer to accumulating journal data in the journal data block JDB using the journal data manager 240. For example, the journal data manager 240 may accumulate journal data in the journal data block JDB. In addition, when the metadata block MDB including the first metadata is written to the memory device 300, the journal data manager 240 may add the first metadata storage information MSI1, which includes information about storage of the metadata block MDB, to the journal data block JDB. In an exemplary embodiment of the present inventive concept, the first metadata storage information MSI1 may include a metadata block age, which is assigned to each metadata block MDB by the journal data manager 240, and a PPN in the memory device 300, in which the metadata block MDB is stored. The metadata block age may refer to information which the journal data manager 240 assigns to each metadata block MDB. As a non-limiting example, the journal data manager 240 may assign a metadata block with an age increasing by 1 each time when a new metadata block is generated. When the amount of data accumulated in the journal data block JDB reaches a second predetermined size, the journal data manager 240 may write the journal data block JDB to the journal data area 316 of the memory device 300. For example, when the amount of data accumulated in the journal data block JDB reaches the second predetermined size, the journal data manager 240 may control the memory device 300 to write the journal data block JDB to the journal data area 316. For example, the journal data manager 240 may control the memory controller 200 to transmit an address corresponding to the journal data area 316, a write command, and the journal data block JDB to the memory device 300.

According to an exemplary embodiment, the journal data manager 240 may respectively manage metadata and journal data in separate data blocks and respectively store the metadata and the journal data in separate areas of the memory device 300 as separate data blocks. Therefore, dependency of the metadata on the journal data may be reduced, and the amount of metadata written to the memory device 300 may also be reduced as compared to the case of FIGS. 5A and 5B.

In addition, since metadata storage information is added to the journal data block JDB when the metadata block MDB is written to the memory device 300, the memory controller 200 may determine the order of a journal data accumulation time and a metadata write time even in the case of power-on following an event like sudden/unexpected power-off. The order of a journal data accumulation time and a metadata write time may be referred to as a sequence of a journal data accumulation time and a metadata write time. Accordingly, the memory system 400 may secure consistency between metadata and journal data.

Figure 7:
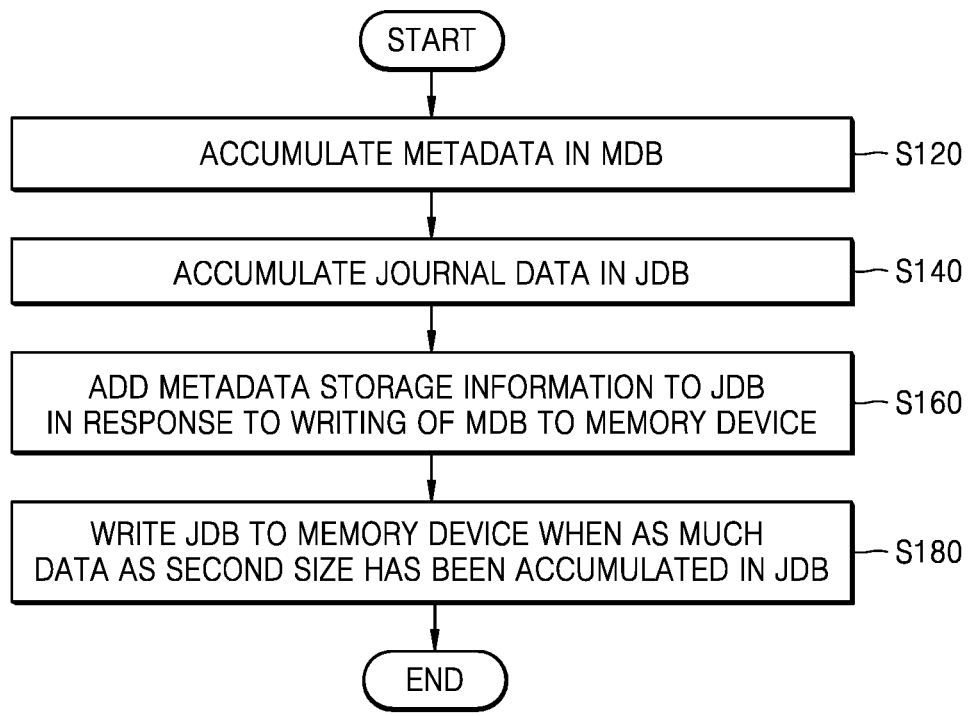
FIG. 7 is a flowchart illustrating a data processing method of a storage device, according to an exemplary embodiment of the present inventive concept.

FIG. 7 is a flowchart illustrating a data processing method of a storage device, according to an exemplary embodiment of the present inventive concept. FIG. 7 will be described with reference to FIGS. 1 and 2 together.

The memory controller 200 may accumulate metadata in the metadata block MDB in operation S120. For example, the journal data manager 240 may accumulate metadata in the metadata block MDB. In an exemplary embodiment of the present inventive concept, the metadata block MDB may be stored in the internal memory 230 of the memory controller 200.

The memory controller 200 may accumulate journal data in the journal data block JDB in operation S140. For example, when a checkpoint occurs in user data and/or metadata, the journal data manager 240 may generate new journal data and accumulate the journal data in the journal data block JDB. In an exemplary embodiment of the present inventive concept, the journal data may include at least one log entry. In an exemplary embodiment of the present inventive concept, the journal data block JDB may be stored in the internal memory 230 of the memory controller 200.

The memory controller 200 may add metadata storage information to the journal data block JDB in response to writing of the metadata block MDB to the memory device 300 in operation S160. In an exemplary embodiment of the present inventive concept, when the amount of metadata accumulated in the metadata block MDB reaches a first size, the journal data manager 240 may write the metadata block MDB to the metadata area 314 of the memory device 300 and add metadata storage information, which includes information about storage of the metadata block MDB, to the journal data block JDB.

When the amount of data accumulated in the journal data block JDB reaches a second predetermined size, the memory controller 200 may write the journal data block JDB to the memory device 300 in operation S180. When the amount of data accumulated in the journal data block JDB reaches the second predetermined size, data up to the second predetermined size has been accumulated in the journal data block JDB. For example, when the amount of data accumulated in the journal data block JDB reaches the second predetermined size, the journal data manager 240 may write the journal data block JDB to the journal data area 316 of the memory device 300.

Figure 8:
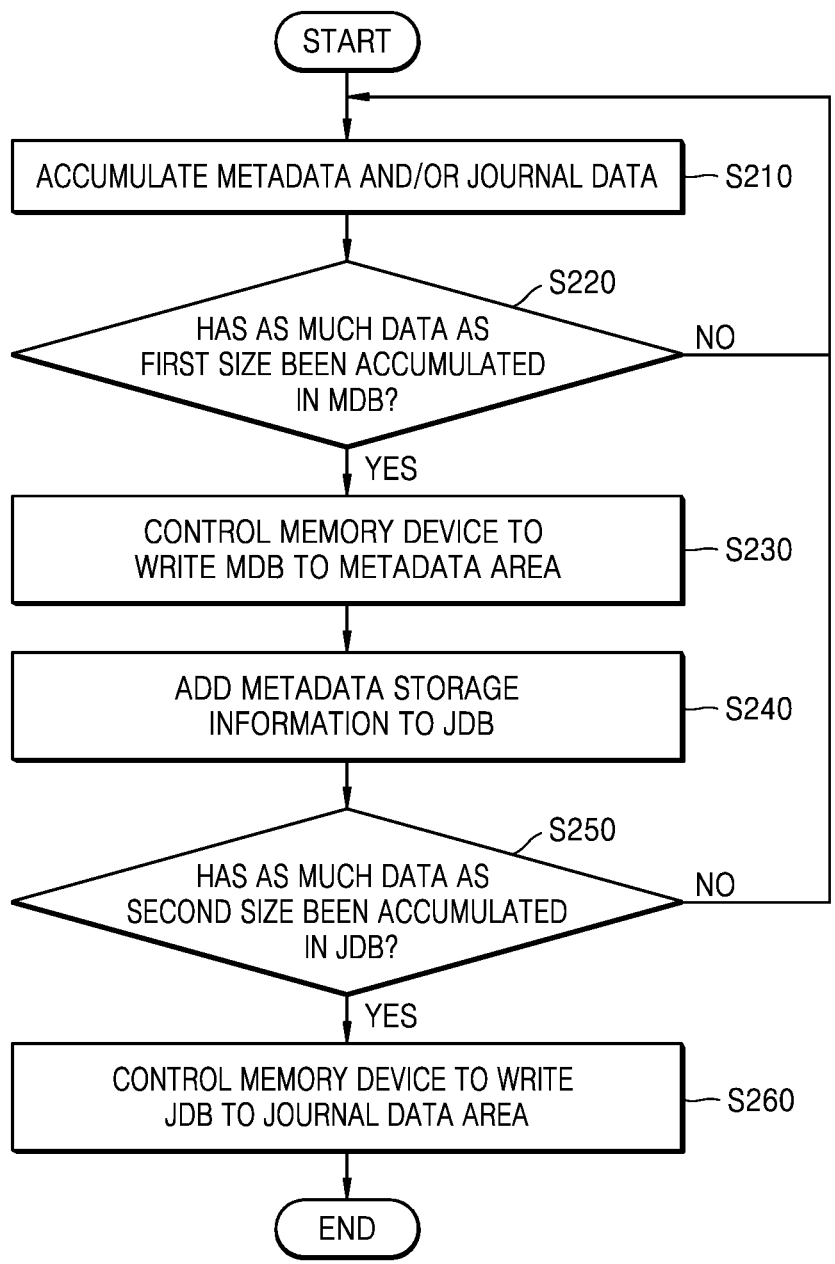
FIG. 8 is a flowchart illustrating a data processing method of a storage device, according to an exemplary embodiment of the present inventive concept.

FIG. 8 is a flowchart illustrating a data processing method of a storage device, according to an exemplary embodiment of the present inventive concept. FIG. 8 will be described with reference to FIGS. 1 and 2 together.

The memory controller 200 may accumulate metadata and/or journal data in operation S210. For example, the memory controller 200 may accumulate metadata in the metadata block MDB and journal data in the journal data block JDB. For example, operation S210 may correspond to operations S120 and S140 in FIG. 7.

The memory controller 200 may determine whether metadata of the first predetermined size has been accumulated in the metadata block MDB in operation S220. When this much metadata has been accumulated in the metadata block MDB, the data processing method may proceed to operation S230. When this much metadata has not been accumulated in the metadata block MDB, the data processing method may return to operation S210.

When metadata of the first predetermined size has been accumulated in the metadata block MDB, the memory controller 200 may control the memory device 300 to write the metadata block MDB to the metadata area 314 in operation S230. For example, the journal data manager 240 may transmit an address corresponding to the metadata area 314, a write command, and the metadata block MDB to the memory device 300.

The memory controller 200 may add metadata storage information, which includes information about storage of the metadata block MDB, to the journal data block JDB in operation S240.

The memory controller 200 may determine whether data of the second predetermined size has been accumulated in the journal data block JDB in operation S250. When data of the second predetermined size has been accumulated in the journal data block JDB, the data processing method may proceed to operation S260. When data of the second predetermined size has not been accumulated in the journal data block JDB, the data processing method may return to operation S210.

It should be noted that operations S220, S230, and S240 need not precede operations S250 and S260. For example, when data of the second predetermined size has been accumulated in the journal data block JDB before the metadata block MDB is written to the memory device 300, the data processing method may proceed to operation S260.

When data of the second predetermined size has been accumulated in the journal data block JDB, the memory controller 200 may control the memory device 300 to write the journal data block JDB to the journal data area 316 in operation S260. For example, the journal data manager 240 may transmit an address corresponding to the journal data area 316, a write command, and the journal data block JDB to the memory device 300.

Figure 9:
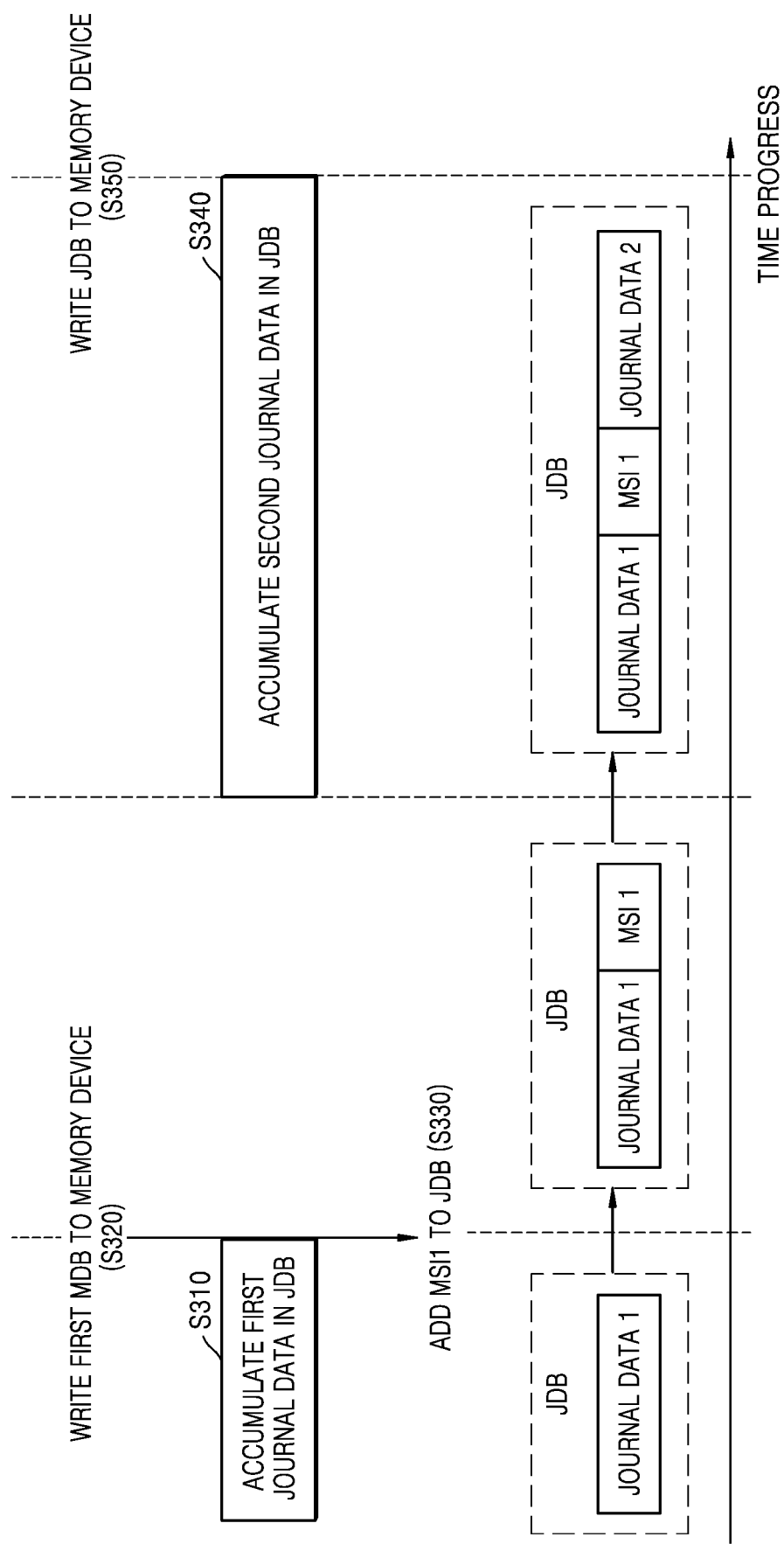
FIG. 9 is a flowchart illustrating a data processing method of a storage device, according to an exemplary embodiment of the present inventive concept.

FIG. 9 is a flowchart illustrating a data processing method of a storage device, according to an exemplary embodiment of the present inventive concept. In particular, FIG. 9 is a diagram illustrating a state in which data is accumulated in the journal data block JDB over time. FIG. 9 will be described with reference to FIGS. 1 and 2 together.

The memory controller 200 may accumulate first journal data in the journal data block JDB in operation S310. An event of writing a first metadata block including first metadata to the memory device 300 may occur in operation S320. For example, as the amount of metadata in the first metadata block reaches a first predetermined size, the first metadata block may be written to the metadata area 314 of the memory device 300.

At this time, the memory controller 200 may add the metadata storage information MSI1, which includes information about storage of the first metadata block, to the journal data block JDB in operation S330. Thereafter, the journal data block JDB may include the first journal data and the first metadata storage information MSI1, as shown in FIG. 9.

Thereafter, the memory controller 200 may accumulate second journal data in the journal data block JDB in operation S340. When the amount of data in the journal data block JDB reaches a second predetermined size while the memory controller 200 is accumulating the second journal data in the journal data block JDB, the memory controller 200 may write the journal data block JDB to the memory device 300 in operation S350. For example, the memory controller 200 may control the memory device 300 to write the journal data block JDB to the journal data area 316.

Figure 10:
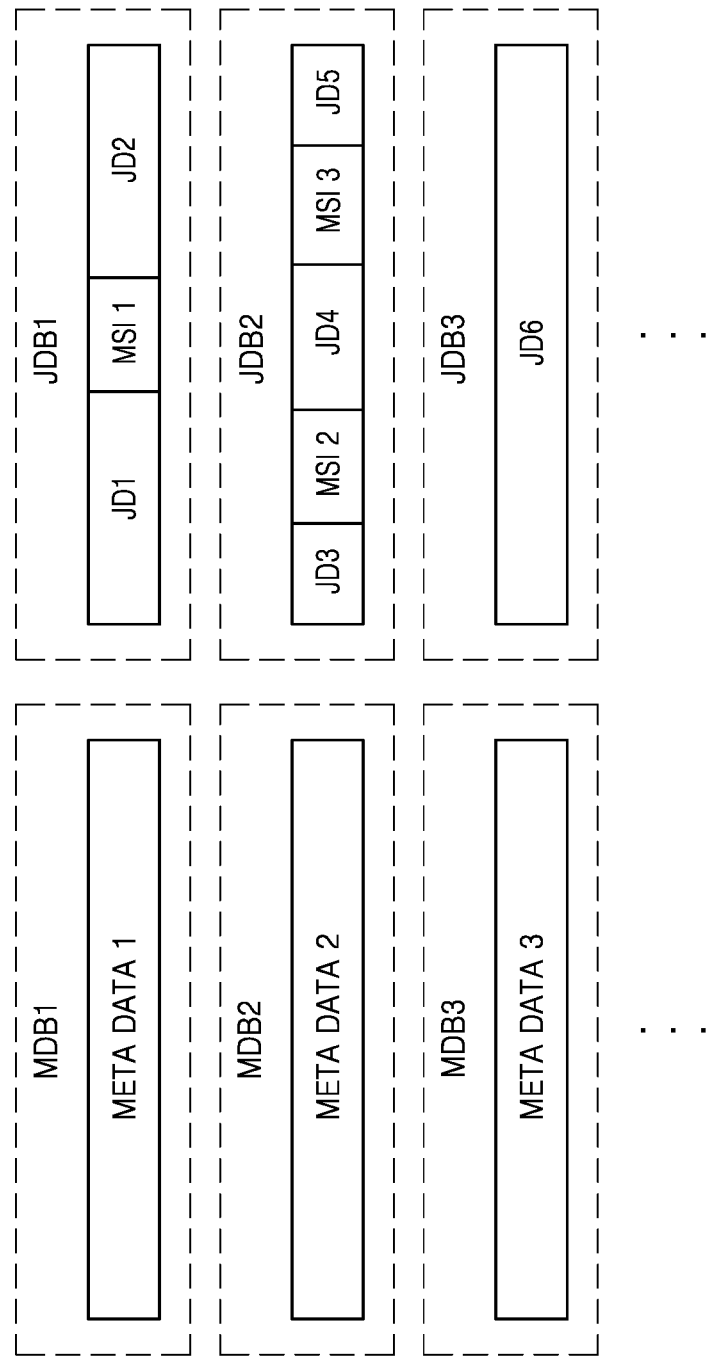
FIG. 10 is a diagram illustrating metadata blocks and journal data blocks, according to an exemplary embodiment of the present inventive concept.

FIG. 10 is a diagram illustrating metadata blocks and journal data blocks, according to an exemplary embodiment of the present inventive concept. In particular, FIG. 10 shows the configurations of journal data blocks according to various embodiments. FIG. 10 will be described with reference to FIGS. 1 and 2 together.

First through third metadata blocks MDB1 through MDB3 may respectively include first through third metadata. A first journal data block JDB1 may include first journal data JD1, first metadata storage information MSI1 including information about storage of the first metadata block MDB1, and second journal data JD2. A second journal data block JDB2 may include third journal data JD3, second metadata storage information MSI2 including information about storage of the second metadata block MDB2, fourth journal data JD4, third metadata storage information MSI3 including information about storage of the third metadata block MDB3, and fifth journal data JD5. A third journal data block JDB3 may include sixth journal data JD6.

For example, a journal data block may include a single item of metadata storage information or multiple items of metadata storage information. In addition, when a metadata block is not written to the memory device 300 while journal data is being accumulated in a journal data block to a second size, the journal data block might not include metadata storage information.

Figure 11:
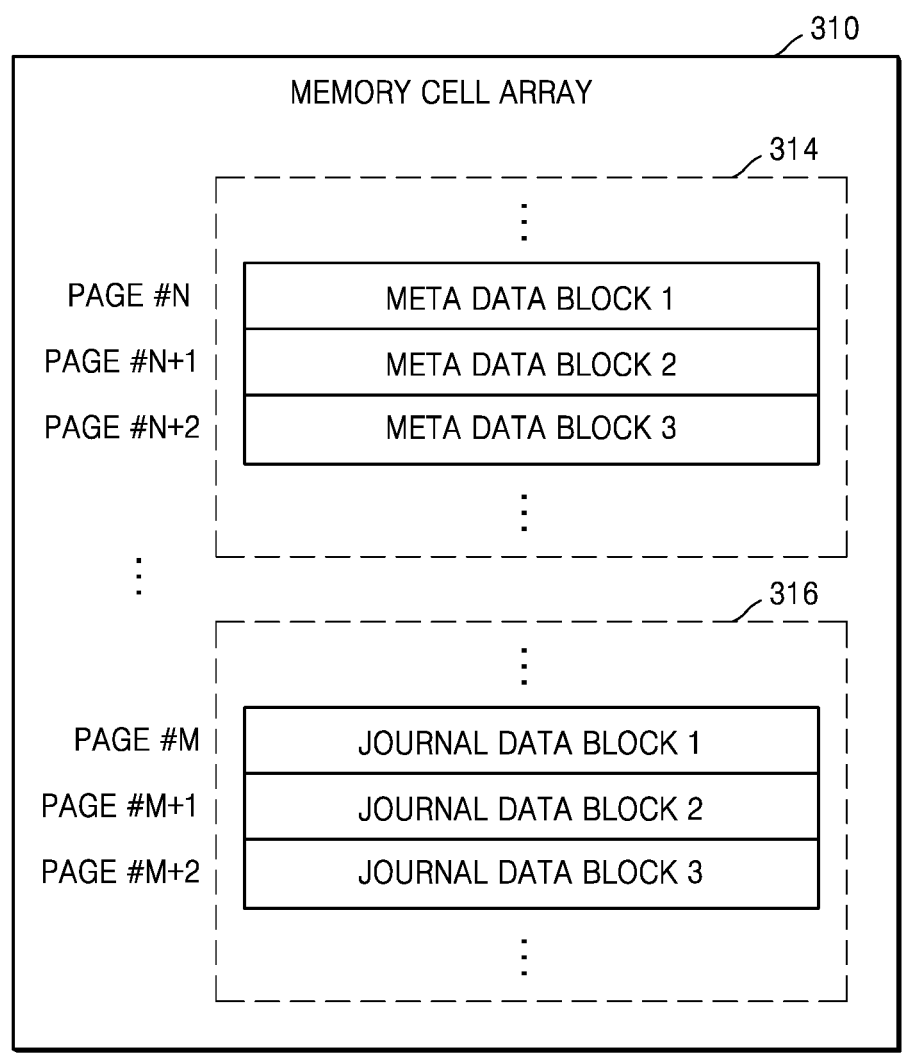
FIG. 11 is a diagram illustrating a memory cell array according to an exemplary embodiment of the present inventive concept.

FIG. 11 is a diagram illustrating the memory cell array 310 according to an exemplary embodiment of the present inventive concept. FIG. 11 will be described with reference to FIGS. 1 and 2 together.

The metadata area 314 may store metadata blocks including first through third metadata blocks. In an exemplary embodiment of the present inventive concept, each of the metadata blocks may be stored in a single memory page of the metadata area 314. For example, the first metadata block may be stored in an N-th memory page, the second metadata block may be stored in an (N+1)-th memory page, and a third metadata block may be stored in an (N+2)-th memory page. For example, a first size, i.e., the size of a metadata block, may be the same as the size of a single memory page of the memory cell array 310.

The journal data area 316 may store journal data blocks including first through third journal data blocks. In an exemplary embodiment of the present inventive concept, each of the journal data blocks may be stored in a single memory page of the journal data area 316. For example, the first journal data block may be stored in an M-th memory page, the second journal data block may be stored in an (M+1)-th memory page, and a third journal data block may be stored in an (M+2)-th memory page. For example, a second size, i.e., the size of a journal data block, may be the same as the size of a single memory page of the memory cell array 310.

Figure 12:
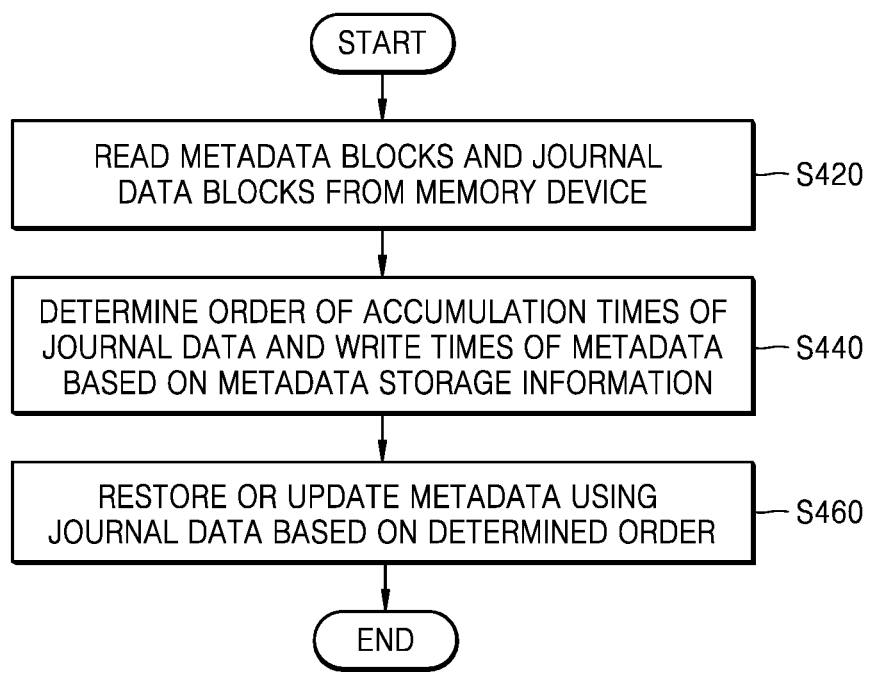
FIG. 12 is a flowchart illustrating a data processing method of a storage device, according to an exemplary embodiment of the present inventive concept.

FIG. 12 is a flowchart illustrating a data processing method of a storage device, according to an exemplary embodiment of the present inventive concept. In particular, FIG. 12 is a flowchart illustrating a data processing method when a memory system is powered on after being powered off. FIG. 12 will be described with reference to FIGS. 1 and 2 together.

When the memory system 400 is powered on after power-off or sudden/unexpected power-off, the memory controller 200 may read metadata blocks and journal data blocks from the memory device 300 in operation S420. For example, the journal data manager 240 may read the metadata blocks from the metadata area 314 and the journal data blocks from the journal data area 316.

The memory controller 200 may determine the order of accumulation times of journal data and write times of metadata based on items of metadata storage information, which are respectively included in the journal data blocks, in operation S440. As described above with reference to FIGS. 6 through 9, since the memory controller 200 adds metadata storage information to the journal data block JDB when the metadata block MDB is written to the memory device 300, the memory controller 200 may determine the order of the accumulation times of the journal data and the write times of the metadata based on the items of metadata storage information. The memory controller 200 may restore or update the metadata based on the determined order in operation S460.

Figure 13:
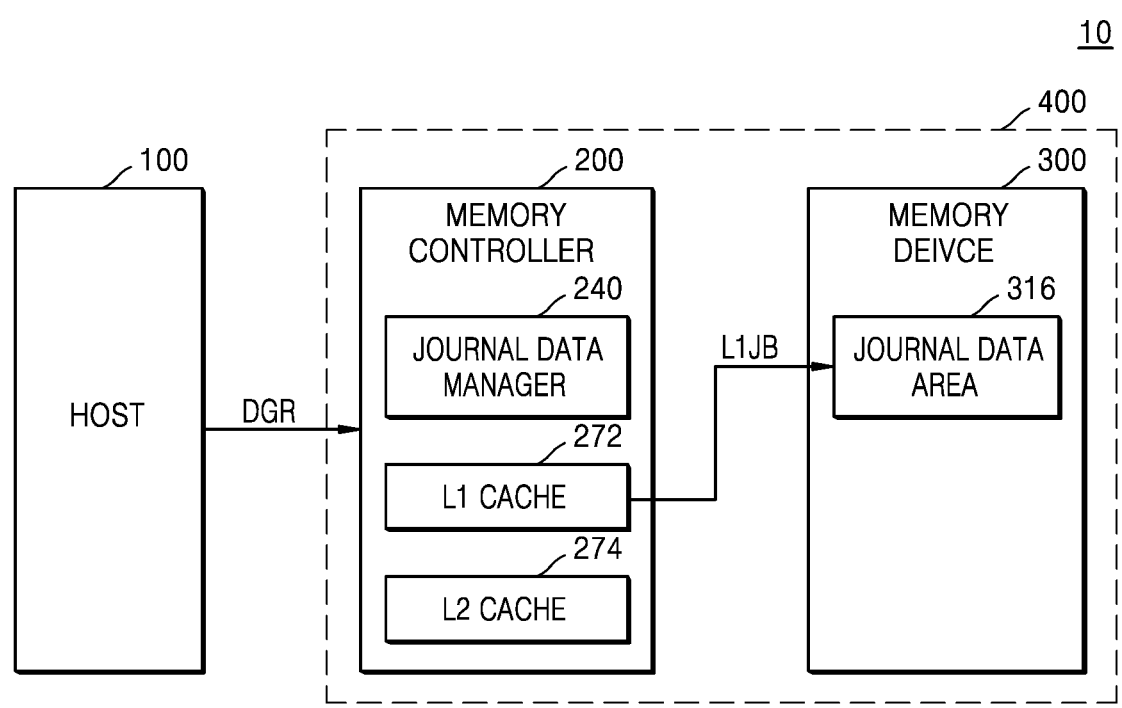
FIG. 13 is a diagram illustrating a data processing system according to an exemplary embodiment of the present inventive concept.

FIG. 13 is a diagram illustrating the data processing system 10 according to an exemplary embodiment of the present inventive concept. In particular, FIG. 13 is a diagram illustrating the data processing system 10 to explain the operation of the memory system 400 when the host 100 provides a data guarantee request DGR to the memory system 400. Redundant descriptions of the data processing system 10 already given with respect to FIG. 1 will be omitted.

While the L2 cache 274 of the memory controller 200 may store data in a form in which the data is written to the memory device 300, the L1 cache 272 may store at least one log entry in an unsorted form before the log entry is written to the memory device 300. When the log entry and various kinds of data in the L1 cache 272 have a high level of importance or according to the need of the host 100, the host 100 may transmit the data guarantee request DGR, which requests guarantee of data in the L1 cache 272, to the memory controller 200.

In response to the data guarantee request DGR, the memory controller 200 may generate a data block using all data in the L1 cache 272 and may write the generated data block to the journal data area 316. The generated data block may be referred to as an L1 journal block L1JB. For example, the memory controller 200 groups all data stored in the L1 cache 272 into the L1 journal block L1JB such that the L1 journal block L1JB may be written to the journal data area 316 as a sort of a journal data block.

An unexpected event like sudden/unexpected power-off may occur in the memory system 400. There may be concern for loss of log entries stored in the L1 cache 272 when an event like sudden/unexpected power-off occurs. According to an exemplary embodiment, the memory controller 200 writes the L1 journal block L1JB to the memory device 300 in response to the data guarantee request DGR from the host 100, and accordingly, the memory controller 200 may read and copy the L1 journal block L1JB from the memory device 300 to the L1 cache 272 after being powered on. Therefore, the concern for the loss of log entries may be reduced.

Consequently, according to an exemplary embodiment, consistency between metadata and journal data may be secured in the data processing system 10 even when an unexpected event like sudden/unexpected power-off occurs.

Figure 14:
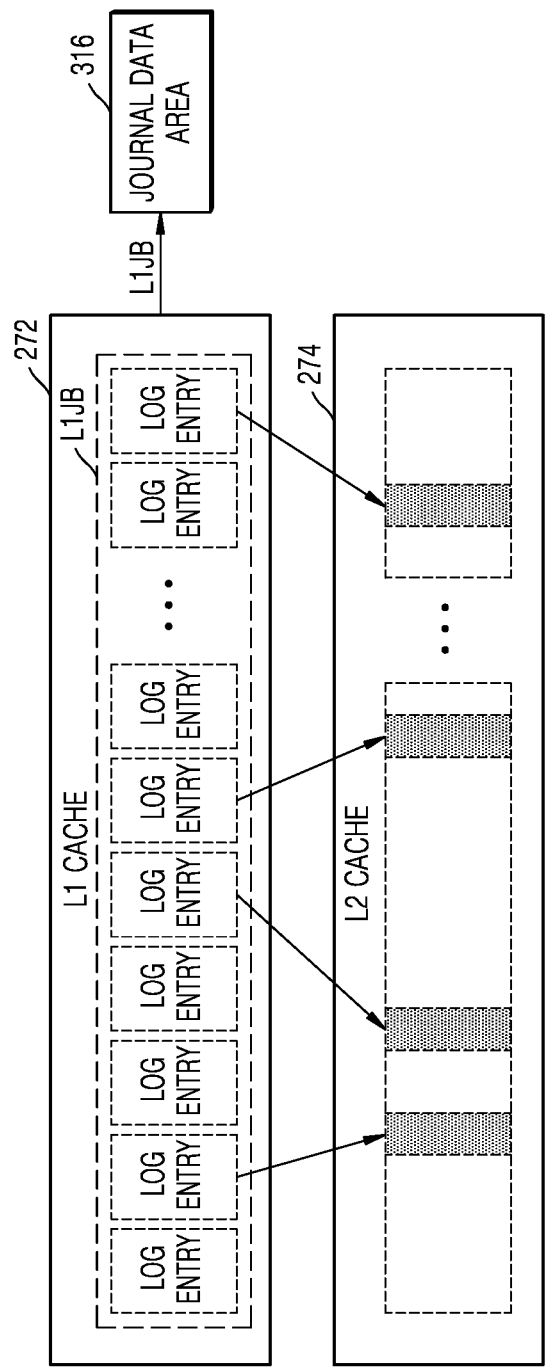
FIG. 14 is a diagram illustrating an L1 cache, an L2 cache, and a journal data area, according to an exemplary embodiment of the present inventive concept.

FIG. 14 is a diagram illustrating the L1 cache 272, the L2 cache 274, and the journal data area 316, according to an exemplary embodiment of the present inventive concept. FIG. 14 will be described with reference to FIG. 13 together.

The L1 cache 272 may store a plurality of log entries in an unsorted form, which is different from a form in which the log entries are stored in the memory device 300. The memory controller 200 may generate data in a form, in which the data is written to the memory device 300, by sorting at least some of the log entries stored in the L1 cache 272 in the L2 cache 274.

When receiving the data guarantee request DGR from the host 100, the memory controller 200 may form the L1 journal block L1JB using all data stored in the L1 cache 272 and write the L1 journal block L1JB to the journal data area 316 of the memory device 300. When the memory system 400 is powered on after sudden/unexpected power-off, the memory controller 200 may restore the log entries to the L1 cache 272 based on the L1 journal block L1JB stored in the journal data area 316.

Figure 15:
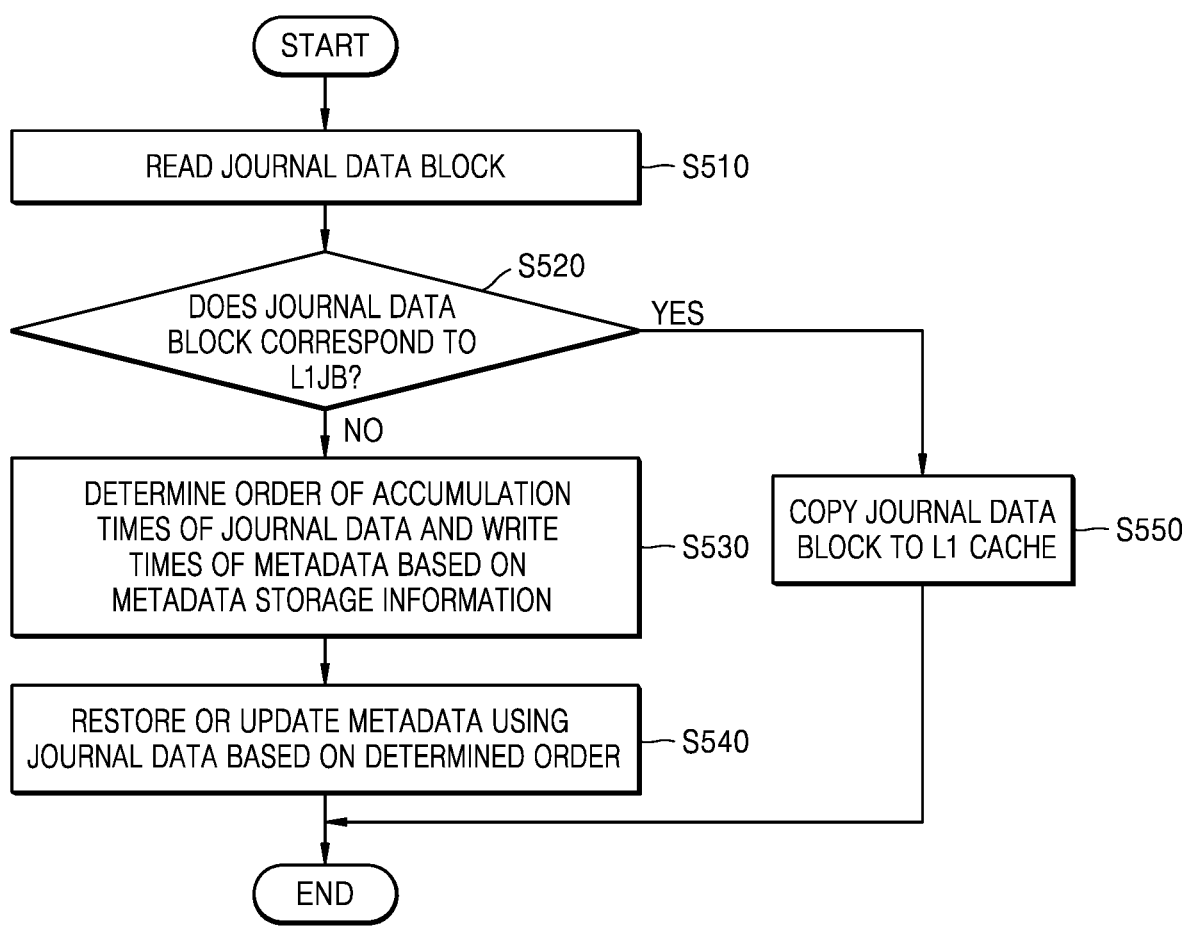
FIG. 15 is a flowchart illustrating a data processing method of a storage device, according to an exemplary embodiment of the present inventive concept.

FIG. 15 is a flowchart illustrating a data processing method of a storage device, according to an exemplary embodiment of the present inventive concept. FIG. 15 will be described with reference to FIG. 13 together.

The memory controller 200 may read a journal data block from the memory device 300 in operation S510. In an exemplary embodiment of the present inventive concept, the memory controller 200 may read journal data blocks from the journal data area 316 of the memory device 300. FIG. 15 is a flowchart illustrating a method of processing one of the journal data blocks that have been read.

The memory controller 200 may determine whether the journal data block corresponds to the L1 journal block L1JB in operation S520. When the journal data block is not the L1 journal block L1JB but an ordinary journal data block, the method may proceed to operation S530. When the journal data block corresponds to the L1 journal block L1JB, the method may proceed to operation S550.

When the journal data block is an ordinary journal data block, which includes journal data and metadata storage information, operations S530 and S540 may be performed. Operation S530 may correspond to operation S440 in FIG. 12, and operation S540 may correspond to operation S460 in FIG. 12. When the journal data block corresponds to the L1 journal block L1JB, the memory controller 200 may copy the L1 journal block L1JB, which has been stored as a journal data block, to the L1 cache 272 in operation S550.

Through the method described above, the memory system 400 may completely restore the log entries that require guarantee.

Figure 16:
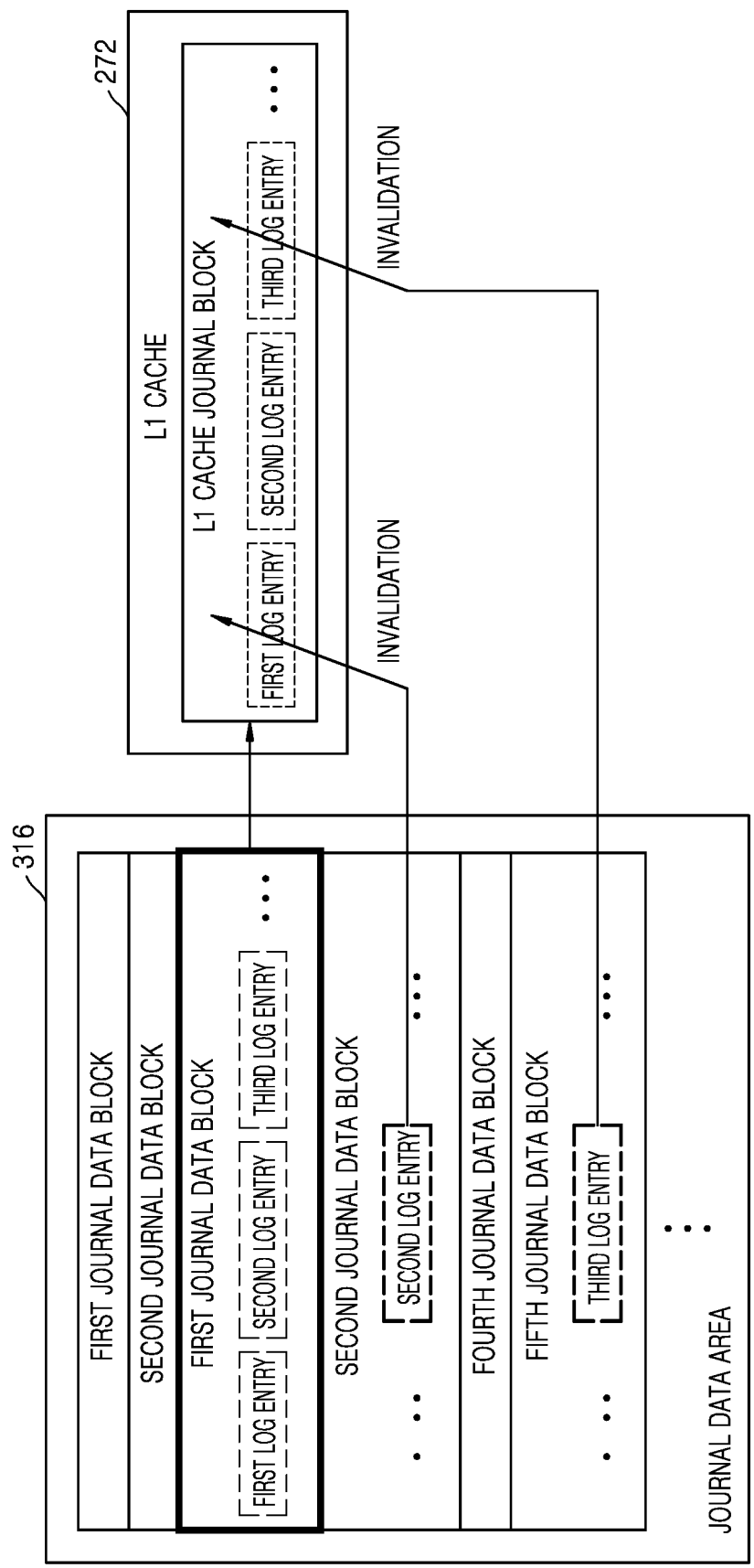
FIG. 16 is a diagram illustrating a journal data area and an L1 cache, according to an exemplary embodiment of the present inventive concept.

FIG. 16 is a diagram illustrating the journal data area 316 and the L1 cache 272, according to an exemplary embodiment of the present inventive concept. FIG. 16 will be described with reference to FIG. 13 together. A storage form of log entries, which is shown in FIG. 16, is just an example for convenience of description.

The journal data area 316 may store first through fifth journal data blocks and an L1 cache journal block. The L1 cache journal block may include a first log entry, a second log entry, and a third log entry. The L1 cache journal block may be a data block that the memory controller 200 generates using all data stored in the L1 cache 272 based on the data guarantee request DGR provided from the host 100 to the memory controller 200.

Meanwhile, the first log entry and the third log entry may be flushed from the L1 cache 272 to the L2 cache 274 and thus be included in a journal data block. For example, the second journal data block may include the second log entry, and the fifth journal data block may include the third log entry.

It is assumed that the first log entry and the third log entry are respectively included in journal data blocks and stored in the journal data area 316 and sudden/unexpected power-off occurs before the second log entry is flushed to the L2 cache 274. In the case of power-on following sudden/unexpected power-off, the memory controller 200 may read journal data blocks and an L1 cache journal block from the journal data area 316. The memory controller 200 may copy the L1 cache journal block to the L1 cache 272. In an exemplary embodiment of the present inventive concept, the memory controller 200 may identify log entries, which are included in the journal data blocks, among log entries included in the L1 cache journal block based on the journal data blocks and may invalidate the identified log entries in the L2 cache 274. For example, the memory controller 200 may invalidate the first log entry and the third log entry among log entries included in the L1 cache journal block based on the second and fifth journal data blocks that have been read. Indicating that a log entry is invalidated may refer to the log entry not being flushed to the L2 cache 274. In an exemplary embodiment of the present inventive concept, after the L1 cache journal block is copied to the L1 cache 272, the memory controller 200 may delete the first log entry and the third log entry from the L1 cache 272 such that the first log entry and the third log entry may be invalidated.

Figure 17:
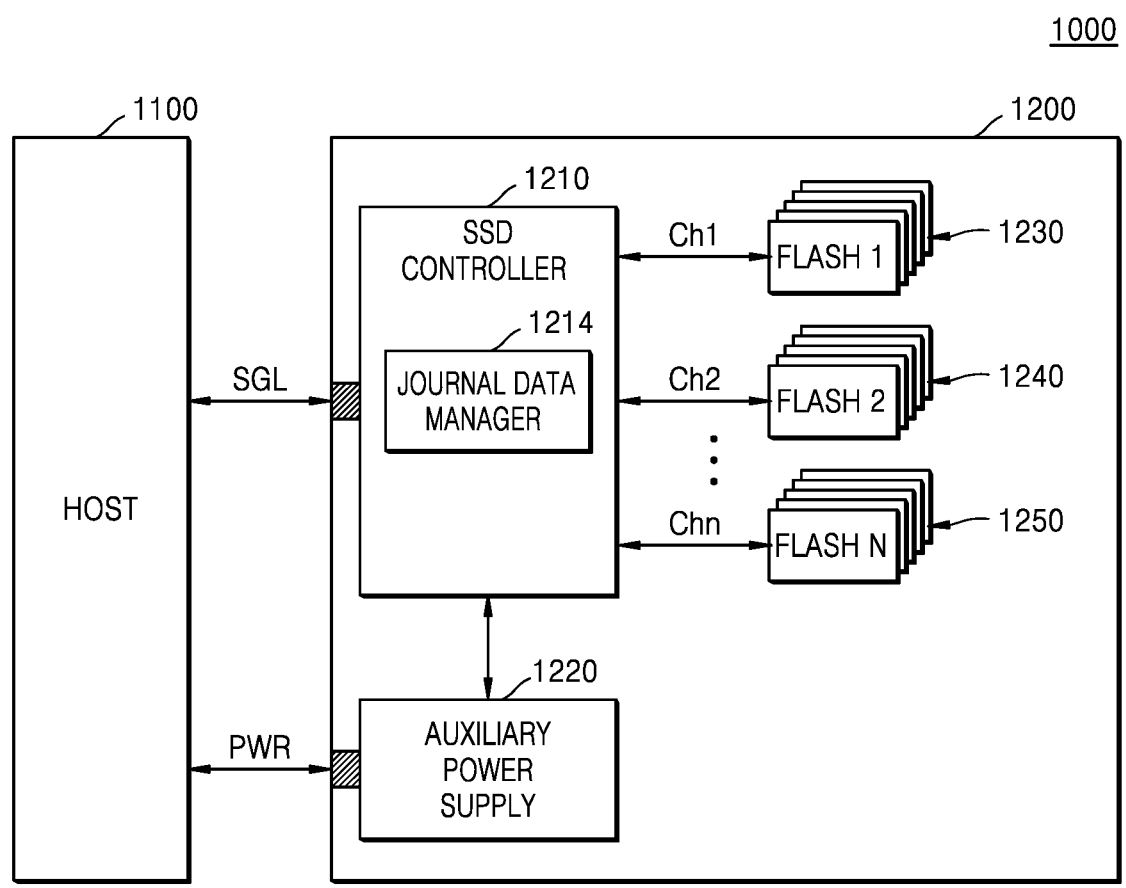
FIG. 17 is a diagram illustrating a solid state disk/drive (SSD) system according to an exemplary embodiment of the present inventive concept.

FIG. 17 is a diagram illustrating an SSD system 1000 according to an exemplary embodiment of the present inventive concept. The SSD system 1000 may include a host 1100 and an SSD 1200. The SSD 1200 may exchange signals with the host 1100 through a signal connector and may receive power through a power connector. The SSD 1200 may include an SSD controller 1210, an auxiliary power supply 1220, and a plurality of flash memory devices 1230, 1240, and 1250. At this time, the SSD 1200 may be implemented using the embodiments illustrated in FIGS. 1 through 4 and FIGS. 6 through 16.

In detail, according to the approach illustrated in FIGS. 1 through 4 and FIGS. 6 through 16, the SSD controller 1210 may include a journal data manager 1214. The journal data manager 1214 may correspond to the journal data manager 240, which has been described in the embodiments illustrated in FIGS. 1 through 4 and FIGS. 6 through 16. According to embodiments, the SSD 1200 may reduce the amount of metadata written to the flash memory devices 1230, 1240, and 1250 and secure consistency between metadata and journal data even when an unexpected event like sudden/unexpected power-off occurs.

While the present inventive concept has been particularly shown and described with reference to embodiments thereof, it will be understood that various changes in form and details may be made therein without departing from the spirit and scope of the present disclosure.

What is claimed is:

1. A storage device, comprising:
a memory device including a user data area, a metadata area, and a journal data area, wherein each of the user data area, the metadata area and the journal data area are separate areas within the storage device; and
a memory controller configured to control the memory device to write a user data block to the user data area, to write a metadata block to the metadata area, and to write a journal data block to the journal data area, the user data block including user data, the metadata block including metadata, and the journal data block including both journal data and metadata storage information,
wherein the journal data includes log information pertaining to the user data and the metadata,
wherein the metadata storage information includes information pertaining to storage of the metadata block,
wherein the memory controller is further configured to add the metadata storage information to the journal data block when the metadata block is written to the memory device,
wherein the memory controller includes an L1 cache storing a plurality of log entries, wherein when a data guarantee request is received from outside the storage device, the memory controller is further configured to generate an L1 cache journal block using all data in the L1 cache and control the memory device to write the L1 cache journal block to the journal data area, and
wherein the memory device stores the metadata block in a memory page of the metadata area and stores the journal data block in a memory page of the journal data area,
wherein the memory controller is further configured to accumulate the metadata in the metadata block, and wherein when an amount of the metadata accumulated in the metadata block reaches a first predetermined size, the memory controller controls the memory device to write the metadata block to the metadata area and to add the metadata storage information to the journal data block, and
wherein the memory controller is further configured to accumulate the journal data and the metadata storage information in the journal data block, and wherein when an amount of the journal data accumulated in the journal data block reaches a second predetermined size, the memory controller controls the memory device to write the journal data block to the journal data area.

2. The storage device of claim 1, wherein the memory controller is further configured to add the metadata storage information to the journal data block when the metadata block is written to the memory device.

3. The storage device of claim 1, wherein, the memory controller is further configured to read the metadata block and the journal data block from the memory device and update the metadata included in the metadata block based on the metadata storage information included in the journal data block, when power is restored following an unexpected power-off.

4. The storage device of claim 3, wherein, the memory controller is further configured to determine an order of an accumulation time of the journal data in the journal data block and a write time of the metadata based on the metadata storage information included in the journal data block, and the memory controller updates the metadata using the journal data based on the determined order, when power is restored following the unexpected power-off.

5. The storage device of claim 1, wherein, the memory controller is further configured to read the L1 cache journal block from the memory device and copy the L1 cache journal block to the L1 cache when power is restored following an unexpected power-off.

6. The storage device of claim 5, wherein, the memory controller is further configured to read the journal data block from the memory device and invalidate a log entry included in the journal data block among the log entries included in the L1 cache journal block, when power is restored following the unexpected power-off.

7. A method for processing data of a storage device, comprising:
accumulating user data in a user data block, using a memory controller;
accumulating metadata in a metadata block, using the memory controller;
accumulating journal data in a journal data block, the journal data including log information pertaining to the metadata, using the memory controller;
adding metadata storage information pertaining to storage of the metadata block to the journal data block when the metadata block is written to a metadata area of a memory device of the storage device, using the memory controller; and
writing the journal data block to a journal data area of the memory device when an amount of data accumulated in the journal data block reaches a first predetermined size,
wherein the memory controller adds the metadata storage information to the journal data block when the metadata block is written to the memory device,
wherein the user data block, the metadata block, and the journal data block are separate areas within the storage device,
wherein the metadata storage information includes an age of the metadata block, and a physical page number in the memory device, in which the metadata block is stored,
wherein the method further comprises:
receiving a data guarantee request from an external source that is external to the storage device; and
writing an L1 cache journal block to the journal data area by grouping all data stored in an L1 cache of the memory controller into the L1 cache journal block in response to the data guarantee request,
wherein the method further comprises accumulating the metadata in the metadata block, using the memory controller, and wherein when an amount of the metadata accumulated in the metadata block reaches a first predetermined size, the memory controller controls the memory device to write the metadata block to the metadata area and to add the metadata storage information to the journal data block, and
wherein the method further comprises accumulating the journal data and the metadata storage information in the journal data block, using the memory controller, and wherein when an amount of the journal data accumulated in the journal data block reaches a second predetermined size, the memory controller controls the memory device to write the journal data block to the journal data area.

8. The method of claim 7, further comprising writing the metadata block to the metadata area when an amount of the metadata accumulated in the metadata block reaches a second predetermined size.

9. The method of claim 8, wherein the first predetermined size and the second predetermined size are each equal to a size of a memory page included in the memory device.

10. The method of claim 7, further comprising:
reading, the metadata block including the metadata and the journal data block including the journal data and the metadata storage information from the memory device in response to a power-on event following an unexpected power-off event;
determining an order of an accumulation of the journal data and a write of the metadata based on the metadata storage information, using the memory controller; and
restoring or updating at least part of the metadata using the journal data based on the determined order.

11. The method of claim 7, further comprising:
reading a data block stored in the journal data area from the memory device in response to power-on following power-off;
determining whether the data block is the L1 cache journal block; and
copying the data block to the L1 cache when the data block is die L1 cache journal block.

12. The method of claim 7, further comprising:
reading the journal data block stored in the journal data area from the memory device in response to a power-on event that follows an unexpected power-off event; and
invalidating a log entry included in the journal data block among log entries included in the L1 cache journal block.

13. A method for processing data of a storage device, comprising:
accumulating, by a memory controller, first journal data in a journal data block;
writing a user data block to a user data area of a memory device of the storage device;
writing a first metadata block to a metadata area of the memory device of the storage device;
accumulating, by the memory controller, metadata storage information about storage of the first metadata block in the journal data block;
accumulating, by the memory controller, second journal data in the journal data block; and
writing the journal data block to a journal data area of the memory device,
wherein the memory controller adds the metadata storage information to the journal data block when the first metadata block is written to the memory device,
wherein the user data area, the metadata area, and the journal data area are separate areas within the storage device,
wherein the method further comprises:
reading die journal data block from the memory device in response to a power-on event following an unexpected power-off event;
determining that the second journal data is accumulated after the first metadata block is written, using the metadata storage information included in the journal data block; and
restoring or updating metadata included in the first metadata block using the first journal data and/or the second journal data, and
wherein the method further comprises accumulating the metadata in the metadata block, using the memory controller, and wherein when an amount of the metadata accumulated in the metadata block reaches a first predetermined size, the memory controller controls the memory device to write the metadata block to the metadata area and to add the metadata storage information to the journal data block, and
wherein the method further comprises accumulating the journal data and the metadata storage information in the journal data block, using the memory controller, and wherein when an amount of the journal data accumulated in the journal data block reaches a second predetermined size, the memory controller controls the memory device to write the journal data block to the journal data area.

* * * * *